(12) United States Patent
Glaser et al.

(10) Patent No.: US 8,955,902 B2
(45) Date of Patent: Feb. 17, 2015

(54) UNIVERSAL FASTENING DEVICE

(75) Inventors: Scott W. Glaser, Lacon, IL (US); Dominick Brian Rivara, IV, Peoria, IL (US); Clifton R. Gerke, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 629 days.

(21) Appl. No.: 13/105,449

(22) Filed: May 11, 2011

(65) Prior Publication Data

US 2012/0284973 A1   Nov. 15, 2012

(51) Int. Cl.
| | | |
|---|---|---|
| B62D 33/06 | (2006.01) | |
| F16B 5/12 | (2006.01) | |
| F16B 37/04 | (2006.01) | |
| F16B 5/08 | (2006.01) | |
| F16B 37/00 | (2006.01) | |
| F16B 37/06 | (2006.01) | |

(52) U.S. Cl.
CPC ............... F16B 5/121 (2013.01); F16B 37/04 (2013.01); *F16B 5/08* (2013.01); *F16B 37/005* (2013.01); *F16B 37/061* (2013.01)
USPC ............ 296/190.08; 24/457; 160/368.1; 296/193.12

(58) Field of Classification Search
CPC ............................ B62D 27/023; B62D 21/02
USPC ............ 296/29, 193.12, 193.07, 205, 190.08; 411/971, 965, 970; 24/457, 591; 160/368.1

IPC ..................................... F16B 5/08; B62D 33/06
See application file for complete search history.

(56) References Cited

U.S. PATENT DOCUMENTS

| | | | | |
|---|---|---|---|---|
| 2,291,290 A | * | 7/1942 | Tinnerman | 411/175 |
| 2,455,145 A | * | 11/1948 | Swanstrom | 411/85 |
| 2,647,004 A | * | 7/1953 | Stieglitz | 292/256.73 |
| 2,649,126 A | * | 8/1953 | Tinnerman | 411/113 |
| 2,665,165 A | * | 1/1954 | Pitman | 296/193.12 |
| 3,373,789 A | * | 3/1968 | Parkin et al. | 411/112 |
| 3,491,820 A | * | 1/1970 | Ostling | 52/796.1 |
| 3,495,643 A | * | 2/1970 | Dey et al. | 411/113 |
| 3,695,324 A | * | 10/1972 | Gulistan | 411/111 |
| 3,848,839 A | | 11/1974 | Tillman | |
| D265,381 S | | 7/1982 | Borja | |
| 4,458,872 A | * | 7/1984 | Couch | 248/497 |
| 5,193,868 A | * | 3/1993 | O'Toole | 292/341.15 |
| D349,038 S | | 7/1994 | Sachs | |
| 7,182,563 B2 | * | 2/2007 | Wimmer et al. | 411/174 |
| 8,047,311 B2 | * | 11/2011 | Waletzko et al. | 180/9.5 |
| 2010/0192334 A1 | * | 8/2010 | Reichle et al. | 24/457 |

* cited by examiner

*Primary Examiner* — Pinel Romain
(74) *Attorney, Agent, or Firm* — Miller, Matthias & Hull

(57) ABSTRACT

A fastener for a machine frame is disclosed. The fastener may comprise a seat portion, at least one arm extending from the seat portion, and a back portion oriented to extend from the seat portion. The back portion may define an aperture therethrough. The fastener may also include a clip having a first side and a second side. The first side may define a window and the second side may include a flange that defines a port therethrough. The back portion may be sandwiched between the first and second sides of the clip and the window and port may each be generally aligned with the aperture.

19 Claims, 4 Drawing Sheets

UNIVERSAL FASTENING DEVICE

TECHNICAL FIELD

The present disclosure generally relates to a fastener and, more particularly, relates to fasteners used to connect components to frames of machines, vehicles and the like.

BACKGROUND

Fasteners may be used on machines, vehicles, and the like (collectively, "machines") to facilitate routing of wires, wiring harnesses or cables (collectively, "cables") used for electrical communications, electrical power and to facilitate the connection of non-metallic parts, such as interior trim components, to the frame of the machine, particularly the interior of the cab. Typically, such a fastener is placed on the frame and then welded to the frame. For example, in a machine cab both cables and non-metallic parts must be attached to the interior wall surface of the cab frame. To install the cables or non-metallic parts, a fastener is first welded onto the surface of the interior wall of the cab. Disadvantageously, the heat of the welding process on the interior wall tends to distort the exterior surface on the opposite side of the wall. This distortion creates an uneven appearance on the exterior wall surface that may still be visible even after the application of a coat of paint.

U.S. Pat. No. 7,182,563 issued Feb. 27, 2007 (the "'563 patent") discloses a fastener with a U-shaped clamping region that grips components. The fastener comprises a first leg and a second leg. The disclosure describes a stud being first welded to the frame wall of a machine and then the fastener being "screwed" onto the welded stud. It is this type of arrangement, one that requires a part to be welded directly to a frame wall, that produces the distortion described above and desired to be avoided. What is needed is a fastener, that may be used for attaching both metallic and non-metallic parts and that is configured such that it may be projection (drawn arc) welded to a frame wall. In such projection welding the fastener is heated until the contact surface or seat is able to adhere to the frame when placed on it. Thus, heat distortion to the exterior of the frame wall is minimized or eliminated.

SUMMARY OF THE DISCLOSURE

In accordance with one aspect of the disclosure, a fastener is disclosed. The fastener may comprise a seat portion, a back portion extending from the seat portion and including an aperture therethrough, and a first arm joined to the back and seat portions. The first arm may be oriented to extend from the seat portion in generally the same direction as the back portion.

In accordance with another aspect of the disclosure, a fastener including a clip is disclosed. The fastener may comprise a seat portion, a pair of opposing arms extending from the seat portion, a back portion oriented to extend from the seat portion and disposed between the pair of arms, the back portion defining an aperture therethrough, and a clip having a first side and a second side. The first side may define a window and the second side may include a flange that defines a port therethrough. The back portion may be sandwiched between the first and second side of the clip and the window and port may each be generally aligned with the aperture.

In accordance with a further aspect of the disclosure, a machine cab is disclosed. The machine includes a cab frame having an interior wall surface, a fastener, and a machine component. The fastener may include a substantially planar seat portion fixedly attached to the interior wall surface, a pair of opposing arms extending from the seat portion, and a back portion oriented to extend from the seat portion and disposed between the pair of arms. The back portion may define an aperture therethrough. A machine component may be secured to the back portion by a securing member.

DETAILED DESCRIPTION

Figure 1:
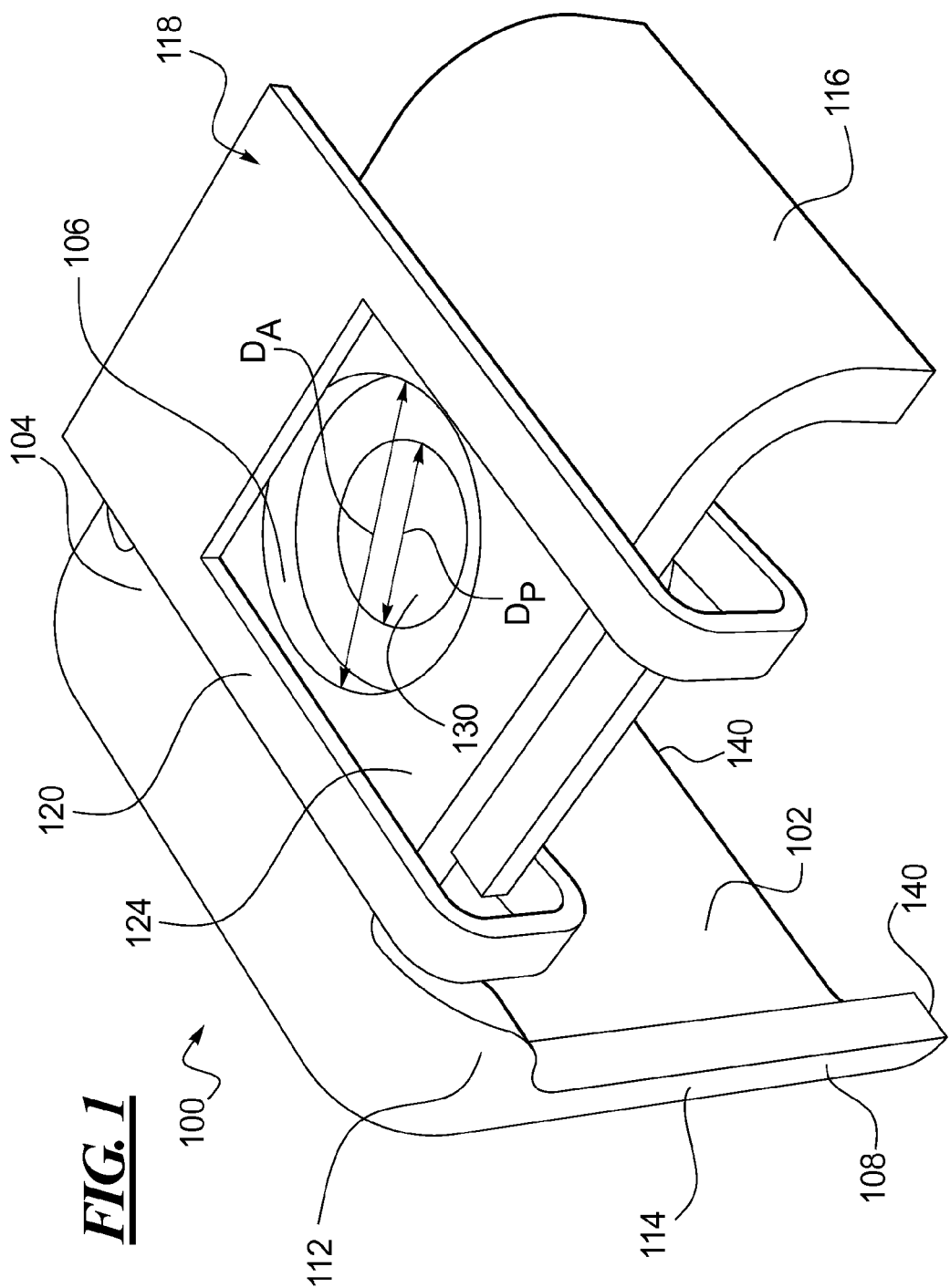
FIG. 1 is a perspective view of an exemplary fastener constructed in accordance with the teachings of this disclosure.

The following is a detailed description of exemplary embodiments of the invention. The exemplary embodiments described herein and illustrated in the drawing figures are intended to teach the principles of the invention, enabling those of ordinary skill in this art to make and use the invention in many different environments and for many different applications. The exemplary embodiments should not be considered as a limiting description of the scope of patent protection. The scope of patent protection shall be defined by the appended claims, and is intended to be broader than the specific embodiments described herein.

Figure 2:
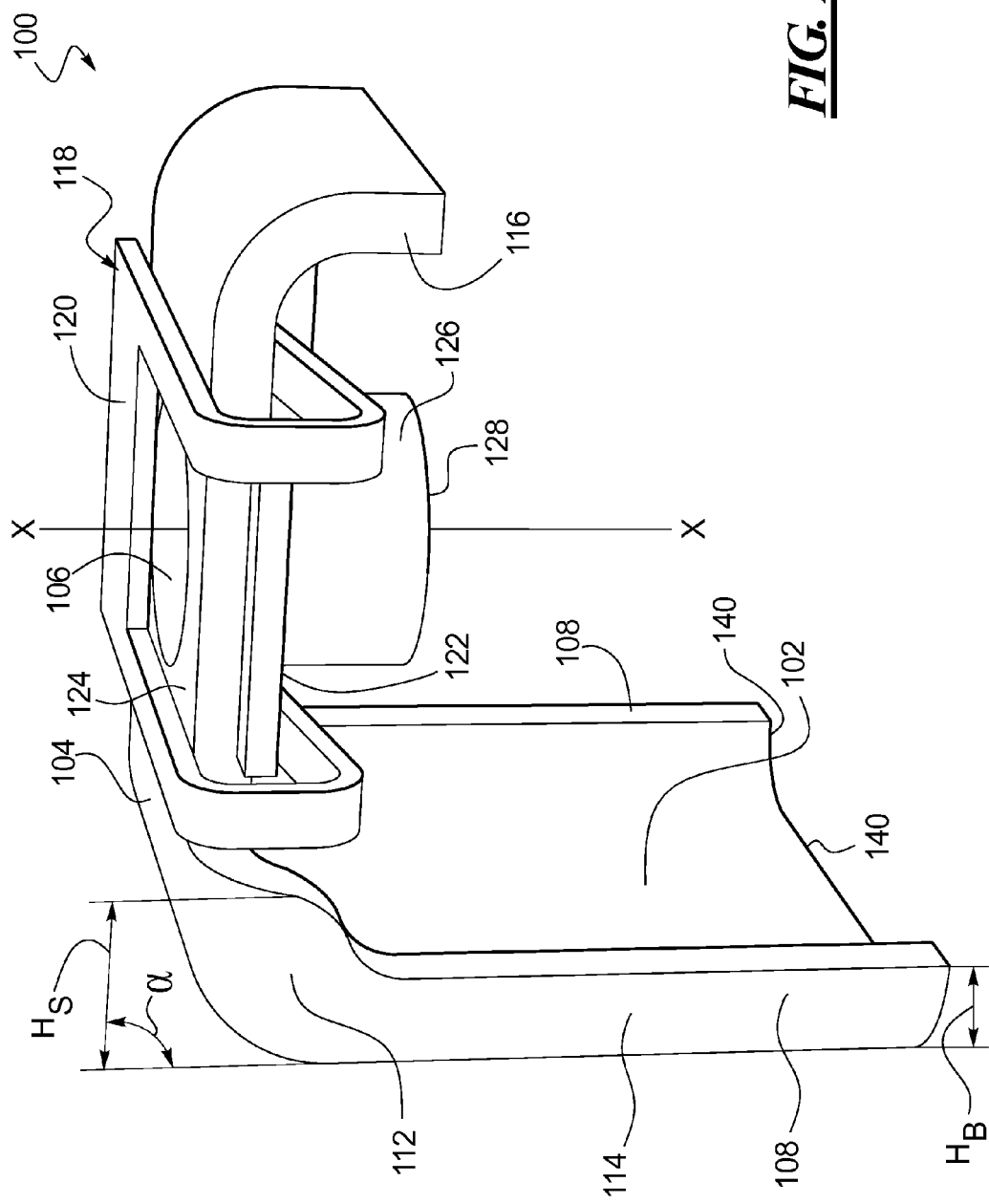
FIG. 2 is another perspective view of the exemplary fastener of FIG. 1.

Referring now to the drawings, and with specific reference to FIGS. 1-2, there is shown a fastener constructed in accordance with the present disclosure and generally referred to by reference numeral 100. The fastener 100 may comprise a seat portion 102, an arm 108, a back portion 104 and a bottom surface 140. The seat portion 102 may be generally planar in shape. The back portion 104 may extend from the seat portion 102 and include an aperture 106 therethrough. The plane defined by the back portion 104 may be substantially perpendicular to the plane defined by the seat portion 102. In other embodiments, the plane defined by the back portion 104 may form an angle $\alpha$ with the plane defined by the seat portion 102. The angle $\alpha$ may be a right angle or an acute angle or an obtuse angle. The aperture 106 may be configured to receive a securing member 110 (see FIG. 4), for example, a zip tie, a bolt, a screw or the like. In the alternative, the back portion 104 and/or the aperture 106 may be configured to receive a weld nut through which a securing member 110 such as a bolt, a screw or the like may then be inserted through the aperture 106. The bottom surface 140 may be generally planar.

In some embodiments, the fastener 100 may include one arm 108. In other embodiments, the fastener 100 may comprise, instead of one arm 108, a pair of opposing arms 108. In the embodiment illustrated in FIGS. 1-2, the fastener 100 includes two arms 108. The arms 108 may be joined to the back and seat portions 104, 102 and may be oriented to extend from the seat portion 102 in generally the same direction as the back portion 104. In an embodiment, the seat portion 102 may stretch continuously between each of the pair of arms 108.

As seen in FIGS. 1-2, the arms 108 may be disposed along the entire length of the seat portion 102. Each arm 108 may be disposed proximal to an edge of the seat portion 102. In yet other embodiments, the arm 108 may be divided into sections disposed intermittently along the seat portion 102 proximal to the edge of the seat portion 102.

Each arm 108 may comprise a shoulder portion 112 and a body portion 114. The shoulder portion 112 may slope toward the body portion 114. The slope may be generally rounded or may be angled. Each shoulder portion has a shoulder height $H_S$ and each body portion 114 has a body height $H_B$ and the ratio of the shoulder height $H_S$ to the body height $H_B$ may, in some embodiments, be in the range of about 2:1 to about 3:1. For example, in the embodiment illustrated in FIGS. 1-2, the shoulder height $H_S$ is about 5 millimeters and the body height $H_B$ is about 2 millimeters.

The fastener 100 may also include a stem portion 116 disposed on the back portion 104 distal from the seat portion 102 and oriented generally parallel to the seat portion 102. The juncture of the stem portion 116 and the back portion 104 may form an arc A.

The seat portion 102, back portion 104, arms 108 and stem portion 116 may be unitary or may be separate elements affixed together. In the preferred embodiment, such elements of the fastener 100 are integral and are made of steel, or the like.

The fastener 100 may also include a clip 118. The clip 118 may be removable. The clip 118 may have a first side 120 and a second side 122. The first side 120 may define a window 124 and the second side 122 may include a flange 126 defining a port 128 therethrough. The inner surface 130 of the flange 126 that defines the port 128 may be threaded. The back portion 104 may be sandwiched between the first and second sides 120, 122 of the clip 118 and the window 124 and the port 128 may each be generally aligned with the aperture 106 in the back portion 104. The flange 126 may define a center axis X that is generally parallel to the plane defined by the seat portion 102.

The port 128 may have a port diameter $D_P$ and the aperture 106 may have an aperture diameter $D_A$. In some embodiments, the port diameter $D_P$ may be smaller than the aperture diameter $D_A$. The port 128 and flange 126 may be configured to receive a mating securing member 110. A port diameter $D_P$ that is smaller than the aperture diameter $D_A$ allows the use of mating members 110, such as bolts or screws, that have a smaller diameter than the aperture 106, thus increasing the flexibility and range of use for the fastener 100.

The clip 118 may be configured to moveably fit onto the back portion 104. This allows a user to adjust the position of the port 128 and flange 126 (relative to the back portion 104 of the fastener 100) in order to align the flange 126 with a securing member 110 (for example, a mating bolt) prior to insertion of the securing member 110 into the flange 126. Once the securing member 110 is inserted and tightened, depending on the type of securing member 110 and the tightness of the attachment, the clip 118 may become fixed in place or may still have some amount of limited "play" or movement. This arrangement provides for flexibility in the installation of components that utilize the disclosed fastener 100. For example, when installing in a cab trim pieces, such as dashboard components, if one piece is slightly out of place the relative position of each cooperating piece is likely to be effected. Use of the fastener 100, including the clip 118 element, allows for flexibility in the fitting together of component pieces.

Figure 3:
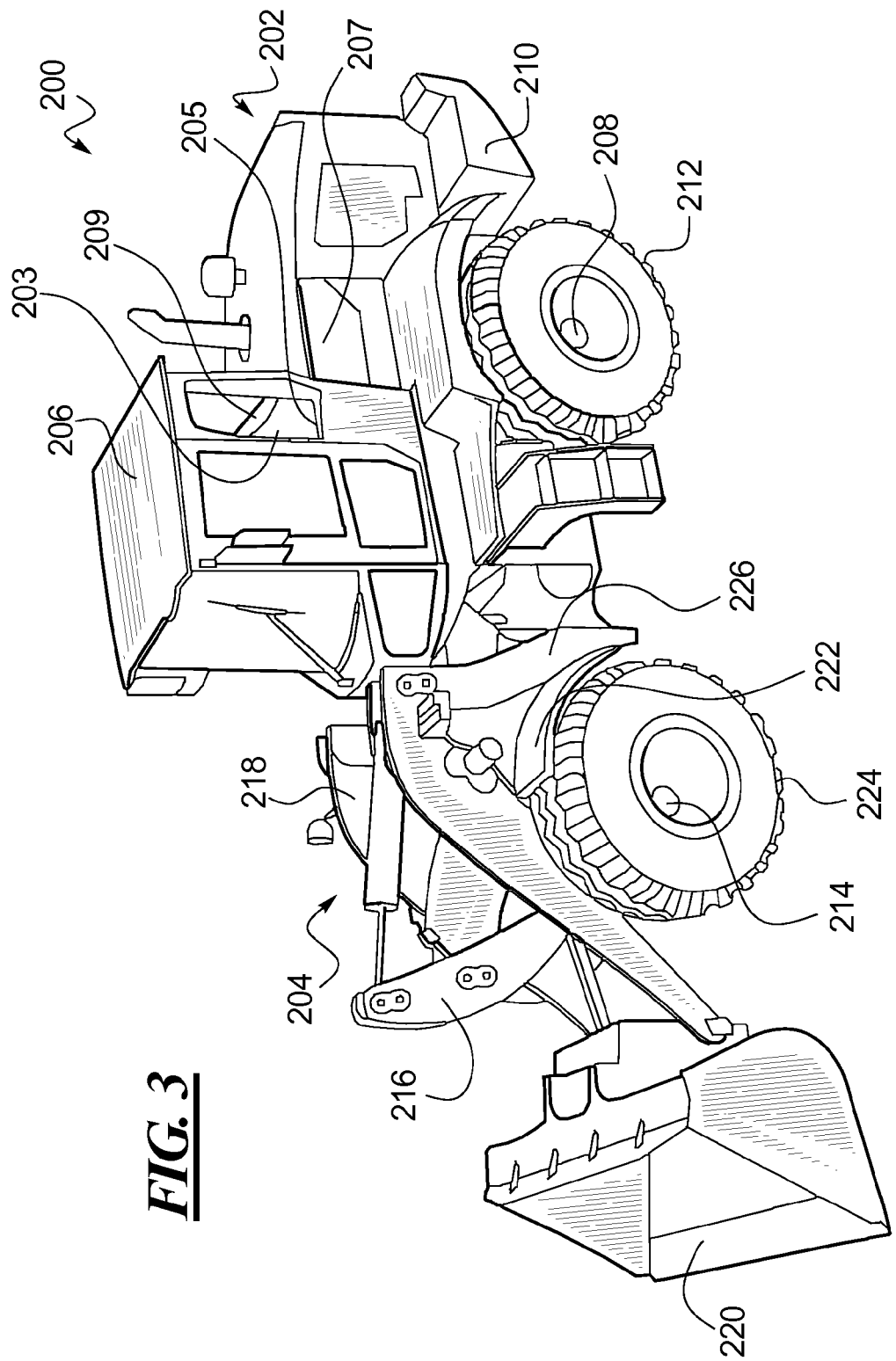
FIG. 3 is a perspective view of a machine that incorporates the features of the present disclosure.

FIG. 3 illustrates one example of a machine 200 that incorporates the features of the present disclosure. The machine 200 includes a rear portion 202 and a front portion 204. The rear portion 202 may include a cab assembly 206 including a frame 203 having an interior wall surface 205, an engine 207, a rear axle housing assembly 208, drive train components (not shown) mounted to a rear frame 210, and cables and non-metallic components 209 mounted to the interior wall surface 205. Rear wheels 212 may be mounted to the rear axle housing assembly 208. The front portion 204 may include a frame assembly 226 and a front axle housing assembly 214. A boom assembly 216 and a lift arm assembly 218 may be mounted on the frame assembly 226. An implement 220 may be attached to the boom assembly 216 and to the lift arm assembly 218. The frame assembly 226 may be mounted on a fender 222. The fender 222 and front wheels 224 may be mounted on the front axle housing assembly 214.

Figure 4:
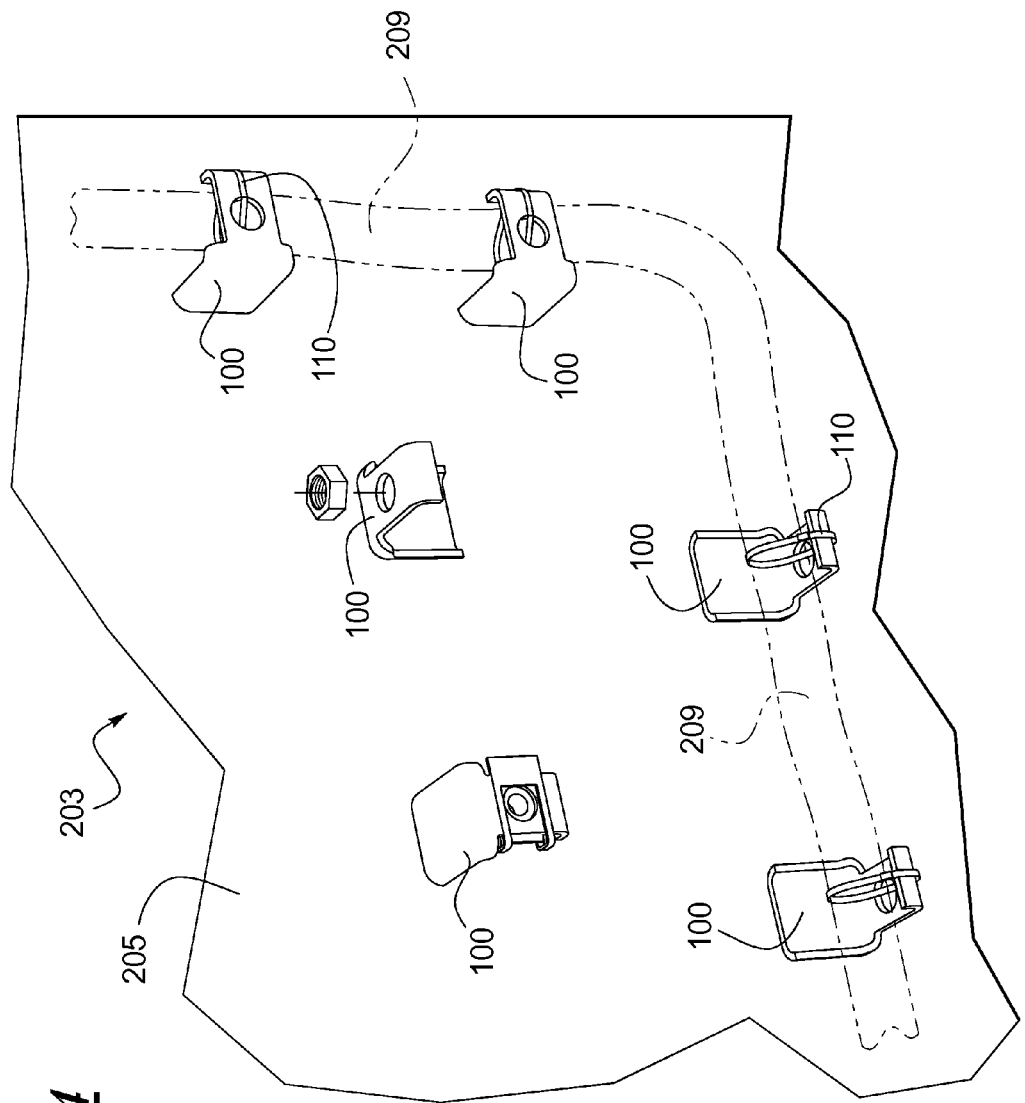
FIG. 4 is a perspective view of the exemplary fastener of FIG. 1 mounted to the interior of the cab of the machine of FIG. 4.

FIG. 4 illustrates an exemplary partial portion of a machine, such as the interior wall surface 205 of the cab frame 203. The machine may include a plurality of components 209 secured to the fastener 100 described above. The components 209 may include, but are not limited to, wires, wiring harnesses, cables, trim components, or the like. In FIG. 4, a wiring harness is illustrated as one example of such a component 209. As shown in FIG. 4, the seat portion 102 or the bottom surface 140 may be affixed to the interior wall surface 205. Preferably, the seat portion 102 or the bottom surface 140 is affixed by projection welding so as not to cause distortion on the exterior surface on the opposite side of the wall. However, the fastener 100 is also suitable for use with other types of welding, such as arc welding.

In the embodiment in FIG. 4, the securing member 110 used in conjunction with the wiring harness is a zip tie. Another embodiment of the fastener 100 is disposed on the interior wall surface 205 of the cab frame 203 awaiting receipt of a mating securing member 110, such as a bolt or screw. Similarly, another embodiment of the fastener 100 is disposed on the interior wall of the cab frame awaiting receipt of a mating securing member 110, such as a bolt or screw. This embodiment has a securing nut aligned over the aperture 106 and welded to the back portion 104 of the fastener 100.

INDUSTRIAL APPLICABILITY

Attachment of fasteners may cause distortion on the opposite side of the frame wall to which the fastener is attached. This may provide an uneven finish on the opposite side of the frame that may not be easily covered with paint or may be emphasized once paint is applied. The present disclosure may find applicability in reducing or eliminating such distortion to the opposite side of the frame wall to which a component fastener is applied by allowing a different type of welding to be used with the fastener while still maintaining the integrity and strength of the fastener.

The fastener may comprise a seat portion, a back portion defining an aperture therethrough, at least one arm and a bottom surface. The back portion or the bottom surface of the fastener may be affixed to the interior wall surface of a machine frame or cab frame. Preferably, the fastener may be affixed by use of projection welding. Machine components may be installed on the frame by securing the components to the fastener.

In one embodiment, a wire harness may be secured to the fastener by a zip tie (or other like securing member known in the art) looped through the aperture and locked. In another embodiment, the securing member may instead be looped around the back portion of the fastener and not through the aperture. The securing member may then be tightened to hold the component in close proximity to the back portion. In such an embodiment, the stem portion keeps the securing member from slipping off the top of the back portion.

In yet another embodiment, a nut may be aligned with the aperture and welded onto the back portion. A mating securing member, such as a bolt or a screw, may then be received by the nut and aperture combination. The securing member may then be tightened in the nut, thus enabling the component attached to the securing member to be held in place on the frame.

In still another embodiment, the fastener may also include a clip that has a flange, which may be threaded. A securing member, such as a bolt or a screw, may then be received by the flange. After tightening the securing member in the flange, the component attached to the securing member may be held in place on the frame wall.

As can be seen from the above discussion, the features disclosed herein may be particularly beneficial to machines with frames on which components are installed.

What is claimed is:

1. A fastener comprising:
   a seat portion;
   a back portion extending from the seat portion and including an aperture therethrough; and
   a first arm including a shoulder portion, the first arm oriented to extend from the seat portion in generally the same direction as the back portion, and wherein the shoulder portion joins the first arm to the seat portion and the back portion.

2. The fastener of claim 1, in which the first arm includes a body portion.

3. The fastener of claim 2, further including a second arm disposed on the seat portion opposite to the first arm, the second arm joined to the back portion and the seat portion and oriented to extend from the seat portion in generally the same direction as the back portion.

4. The fastener of claim 3, in which the second arm includes a second shoulder portion and a second body portion.

5. The fastener of claim 3, wherein the seat portion is generally planar and extends continuously between the first and second arms.

6. The fastener of claim 4, wherein the shoulder portions are generally sloped toward the body portions.

7. The fastener of claim 4, wherein each shoulder portion has a shoulder height and each body portion has a body height and the ratio of the shoulder height to the body height is in the range of about 2:1 to about 3:1.

8. The fastener of claim 1, further including a stem portion disposed on the back portion and oriented generally parallel to the seat portion.

9. The fastener of claim 1, wherein the plane substantially defined by the back portion is generally perpendicular to the plane substantially defined by the seat portion.

10. The fastener of claim 8, wherein a juncture of the stem portion and back portion substantially forms an arc.

11. A machine cab comprising:
    a cab frame having an interior wall surface;
    a fastener including a bottom surface fixedly attached to the interior wall surface, a substantially planar seat portion, a pair of opposing arms extending from the seat portion, and a back portion oriented to extend from the seat portion and disposed between the pair of arms, the back portion defining an aperture therethrough, and wherein the opposing arms each include a shoulder portion joining the arms to the seat portion and the back portion; and
    a machine component secured to the back portion by a securing member.

12. The machine cab of claim 11, wherein the opposing arms each include a body portion.

13. The machine cab of claim 11, wherein the opposing arms are oriented to extend from the seat portion in generally the same direction as the back portion.

14. The machine cab of claim 11, wherein the seat portion extends continuously between the opposing arms.

15. The machine cab of claim 12, wherein the shoulder portions are generally sloped toward the body portions.

16. The machine cab of claim 12, wherein each shoulder portion has a shoulder height and each body portion has a body height and the ratio of the shoulder height to the body height is in the range of about 2:1 to about 3:1.

17. The machine cab of claim 11, further including a stem portion disposed on the back portion and oriented generally parallel to the seat portion.

18. The machine cab of claim 11, wherein the plane substantially defined by the back portion is generally perpendicular to the plane substantially defined by the seat portion.

19. The machine cab of claim 17, wherein a juncture of the stem portion and back portion substantially forms an arc.

\* \* \* \* \*